United States Patent [19]
Axelrod

[11] 4,149,670
[45] Apr. 17, 1979

[54] MARK-SENSE CARD

[75] Inventor: Clive W. Axelrod, Great Neck, N.Y.

[73] Assignee: Securities Industry Automation Corp., New York, N.Y.

[21] Appl. No.: 732,519

[22] Filed: Oct. 14, 1976

[51] Int. Cl.² .................... G06K 19/06; G06K 19/00; G06K 7/14

[52] U.S. Cl. .................... 235/494; 235/487; 235/456

[58] Field of Search .................. 235/61.7 B, 61.11 D, 235/61.11 E, 61.11 R, 61.12 R, 61.12 N, 61.6 R, 54 F, 494, 487, 456, 466; 340/149 A, 146.3 F, 347 DD

[56] References Cited

U.S. PATENT DOCUMENTS

| | | | |
|---|---|---|---|
| 3,380,029 | 4/1968 | Goetz | 235/61.11 D |
| 3,527,927 | 9/1970 | Bijleveld | 235/61.11 E |
| 3,626,368 | 12/1971 | Lee | 340/146.3 F |
| 3,845,280 | 10/1974 | Dillon | 235/61.11 E |
| 3,869,600 | 3/1975 | Hochstadt | 235/61.12 N |
| 3,886,325 | 5/1975 | Dorr | 235/61.6 R |
| 3,925,780 | 12/1975 | Voorhis | 340/347 DD |
| 3,941,976 | 3/1976 | Huhn | 235/54 F |

FOREIGN PATENT DOCUMENTS 817902  8/1959  United Kingdom ............... 235/466

Primary Examiner—Robert M. Kilgore
Attorney, Agent, or Firm—Brumbaugh, Graves, Donohue & Raymond

[57] ABSTRACT

A mark-sense card is preprinted with alphameric characters one or more of which can be selectively activated by a stroke of a pencil or other writing implement. The card is also preprinted with at least one operator that can be selectively activated in a similar manner. The activated alphameric characters are to be interpreted in the normal way if the operator is not activated and in another way if the operator is activated. The addition of the operator thus greatly increases the amount of information that the card is capable of recording.

8 Claims, 5 Drawing Figures

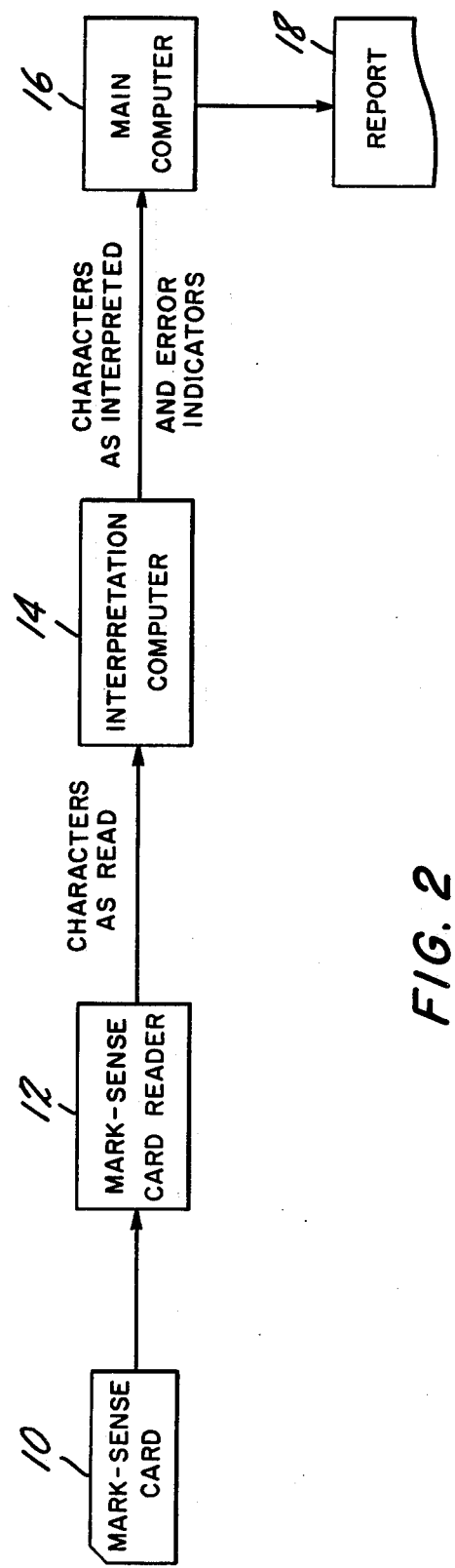

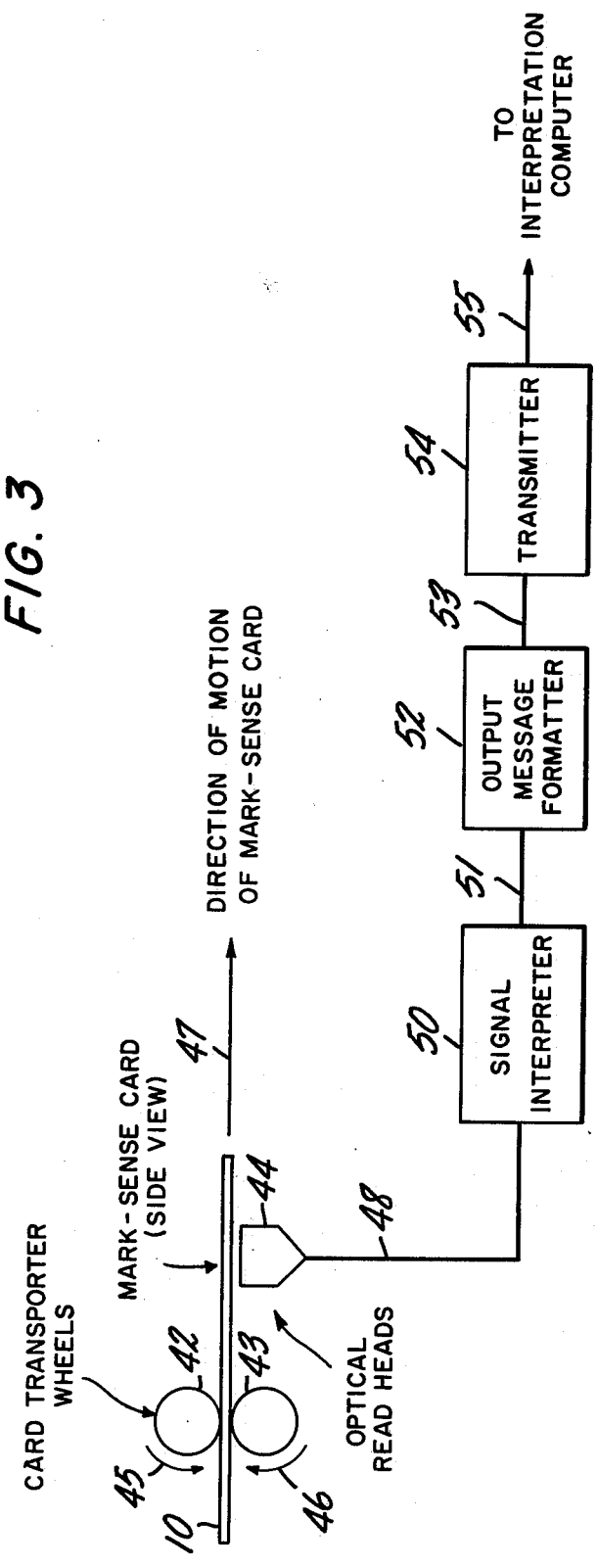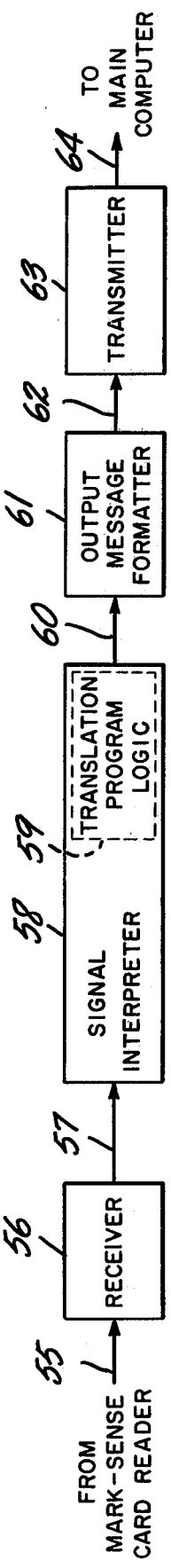

MARK-SENSE CARD

BACKGROUND OF THE INVENTION

This invention relates to machine-readable records and, more particularly, to a novel and highly-effective mark-sense card including a selectively-activated operator that may be preprinted on the card and that greatly increases the amount of information that the card is capable of recording. The invention relates also to apparatus for, and a method of, reading and interpreting the card.

Conventional machine-readable records such as mark-sense cards typically comprise a plurality of indicia, usually alphameric characters, different ones of which can be selectively activated as by marking with a writing implement and, when so activated, are interpreted in a manner that is both conventional and unique. The interpretation is unique in the sense that each set of marked or otherwise activated alphameric characters has one and only one interpretation. This constraint limits the amount of information that can be recorded on the card or other record. More information can be compressed onto the card only by making the individual indicia smaller or placing them closer together. This makes both the marking and the reading and interpretation more difficult and subject to error.

The art of designing and reading mark-sense cards is well developed. A British Pat. No. 817,902 discloses a system for marking and sensing alphameric characters wherein characters are selectively activated by placing marks in separate tracks adjacent to the visually-readable characters. A U.S. Pat. to Bijleveld et al No. 3,527,927 discloses a system for marking numbers which is said to overcome certain drawbacks of the system disclosed in the British patent. The system disclosed in the British patent is susceptible to human errors. The system disclosed in the U.S. patent is intended for general use by a "heterogeneous public" and, in addition to being more closely adapted to the natural writing habits of the public, offers a "self-checking" feature. Each "cipher" or numeral is merely written into a box assigned to that numeral at a position visibly indicated within the box. The absence of a numeral is indicated by striking out or cancelling the cipher indication. A U.S. Pat. to Lee No. 3,626,368 discloses a character-reading machine which includes circuitry that is more sophisticated than that necessary for reading mark-sense cards in which the location, as opposed to the configuration, of a stroke made by a writing implement determines the identity of a character. In all of the prior art, the information that can be recorded on a mark-sense card is severely limited.

SUMMARY OF THE INVENTION

An object of the invention is to remedy the problems of the prior art outlined above and, in particular, to provide a machine-readable record comprising a plurality of indicia that can be selectively activated to record certain information, wherein the amount of information that can be thus recorded is greatly increased as compared to the amount of information that can be recorded on a conventional card of the same size and bearing indicia of the same size and area density.

Among the other objects of the invention are: to provide a machine-readable record the manner of using which is easily learned;

the actual day-to-day use of which is easy, simple and convenient; which is not likely to induce operator error; which is compatible with conventional readers and suitably-programmed computers; and which is particularly adapted for use by specialists at the trading posts of a stock exchange to indicate all the desired information relating to the auction of securities, including an identification of quantities traded, brokers for each side, etc.; and to provide a reliable, fast and inexpensive method of, and apparatus for, reading the machine-readable record.

These and other objects are attained in accordance with the invention by providing a machine-readable record comprising a plurality of indicia, preferably alphameric characters, at least one of which can be selectively activated. The activated indicia are normally given a first interpretation. At least one operator is provided that can also be selectively activated. The operator if activated signifies that the activated indicium or indicia associated therewith are to be given a second interpretation different from the first interpretation.

The record preferably comprises a card adapted for optical scanning, the indicia and operator being preprinted thereon and being activated by means of a writing implement.

In a preferred embodiment of the invention the operator when activated signifies that, if only one of the indicia is activated, it is to be interpreted as though two identical such indicia had been activated, and, if only two of the indicia are activated, the order in which they are normally understood is to be reversed.

The record is read by means for scanning it and generating signals representative of any and all activated operators and indicia thereon, and computer means responsive to the signals for making a determination whether any operators have been activated and for interpreting the signals representative of indicia associated with those operators in accordance with such determination.

Thus in accordance with the invention the information that can be recorded on a deck of mark-sense cards, for example, is significantly increased.

BRIEF DESCRIPTION OF THE DRAWING

A better understanding of the invention can be gained from a consideration of the following detailed description of the preferred embodiments thereof, in conjunction with the appended figures of the drawings, wherein:

FIG. 1 is a schematic representation of the method and apparatus of the invention as broadly conceived;

FIG. 2 is a fragmentary schematic representation of a preferred embodiment of a mark-sense card according to the invention;

FIG. 3 is a schematic representation showing, in greater detail than FIG. 1, a mark-sense card reader forming part of the apparatus of FIG. 1;

FIG. 4 is a schematic representation showing, in greater detail than FIG. 1, an interpretation computer forming another part of the apparatus of FIG. 1.

DESCRIPTION OF THE PREFERRED EMBODIMENTS

Figure 5:
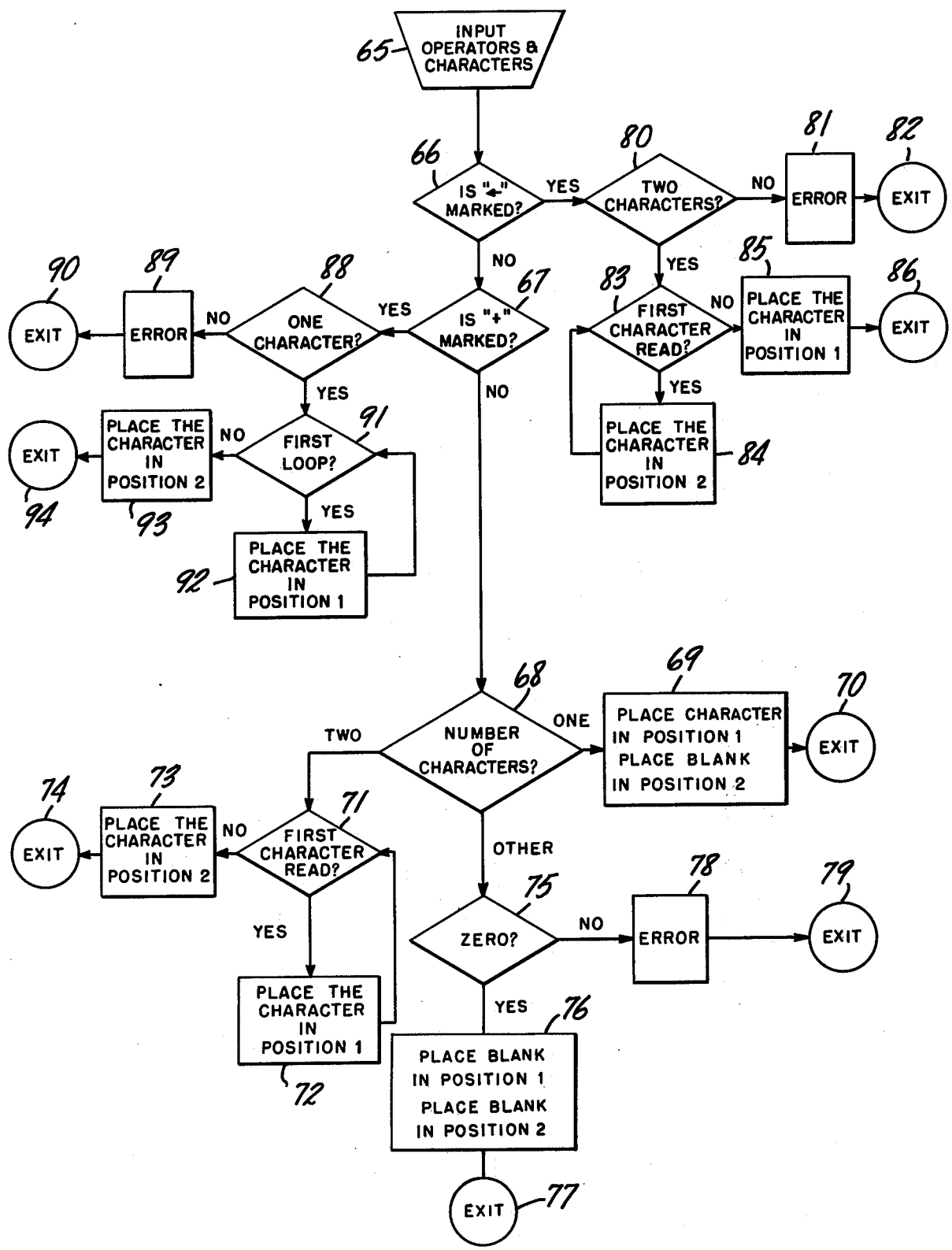
FIG. 5 is a schematic representation of a flow chart showing the operation according to the invention of the interpretation computer of FIGS. 1 and 4.

FIG. 1 shows a mark-sense card 10 adapted to be read by a Bourns mark-sense optical card reader 12. The Bourns card reader is conventional and need not be described in detail. Signals representing the activated alphameric characters appearing on the mark-sense card 10 are developed by the card reader 12 and supplied to an interpretation computer 14. The interpretation computer 14, a suitable example of which is available from Collins Radio, interprets the characters and supplies a main computer 16 with signals representing the characters as interpreted and also representing errors in the marking of the mark-sense card, if any. The main computer 16, which may be UNIVAC or any other suitable computer, processes this information and generates output reports 18 which are printed at one or more locations. These output reports 18 include the information validly recorded on one or a multiplicity of mark-sense cards 10 and/or information relating to the logical errors, if any, made in marking the mark-sense cards. The information content of any individual report 18 depends on the content and the validity of the mark-sense cards and on the destination of the information.

FIG. 2 shows a portion of the mark-sense card 10. The card is shown in fragmentary form to indicate that many sets of alphameric characters may appear on one card, thus permitting the recording of a message more complex than any that can be recorded using only the two alphabet sets shown in FIG. 2.

FIG. 2 shows an "operator" row 20, eleven "alphameric" rows 21 through 31, and, intersecting the twelve rows, four columns 32 through 35. (Note that the terms "row" and "column" are given special meanings in describing mark-sense cards.) In the "operator" row 20, two "reverse" operators 37, having the form of arrows facing to the left, and two "double" operators, having the form of plus signs, are arranged in columns 32, 34 and in columns 33, 35, respectively. Letters A through K of a first alphabet set appear in rows 21 through 31 of column 32, and letters L through Z of the first alphabet set appear in rows 21 through 31 of column 33. Letters A through K of a second alphabet set appear in rows 21 through 31 of column 34, and letters L through Z of the second alphabet set appear in rows 21 through 31 of column 35. The format is merely representative, and, as it will appear, can be varied considerably. For example, numeric characters can be used instead of or in addition to the alpha characters. In addition, Q and R, U and V, W and X, and Y and Z can be allotted separate row, column coordinates rather than being combined as in FIG. 2. The combinations of certain characters shown in FIG. 2 are for the purpose of conserving space and are justified in many applications because certain characters are used relatively infrequently and moreover the context of a message will usually make it clear whether, for example, a Q or an R is intended.

The various characters shown in FIG. 2 are "activated" by a stroke as by drawing a line through them with a pencil or other writing implement. That is, a character that is not so marked conveys no information; it is only the marked characters that convey information. Various mark-sense cards are conventional and widely used. Heretofore, however, the information recordable on a card has been severely limited. For example, using two alphabet sets, as illustrated in FIG. 2, it has been possible to signify only two letters. Thus to indicate the letters "AB" one would mark the letter "A" of the first alphabet set (row 21, column 32) and the letter "B" of the second alphabet set (row 22, column 34). Or, to indicate the letters "BA" one would mark the letter "B" in the first alphabet set (row 22, column 32) and the letter "A" in the second alphabet set (row 21, column 34). It is not possible in conventional practice to distinguish "AB" from "BA" using only one alphabet set, since there is no way to specify the order in which the marked characters are to be interpreted. Likewise, there is no way to specify "AA" using one alphabet set, since the letter "A" appears only once in the alphabet set.

The present invention remedies this problem by adding the "operator" row 20 and the operators 37, 39. The information-recording capability of the card is thereby doubled; i.e. one alphabet set is capable of conveying as much information as two alphabet sets have heretofore been capable of conveying, while the card area is increased by less than 10 percent in the embodiment illustrated in FIG. 2 (12 rows are necessary instead of the 11 that would otherwise be required).

The "reverse" operator 37, when activated by, for example, drawing a pencil mark through it, indicates that two characters should be activated in the alphabet set associated therewith and that these characters are to be interpreted in reverse alphabetical order. For example, if the "reverse" operator and the letters "A" and "B" in the alphabet set associated therewith are activated, then the meaning is "BA". If the letters "AB" in a single alphabet set are activated and the "reverse" operator associated with that alphabet set is not activated, then the activated letters are to be interpreted as "AB". The invention thus enables a total resolution of the ambiguity that would otherwise result from marking two characters of the same alphabet set of a mark-sense card.

If the "double" operator 39 is activated, it means that only one character in the associated alphabet set should be activated and that the activated character is to be interpreted as though activated twice. Thus, if the "double" operator 39 and the letter "A" are activated, the meaning is "AA". If the letter "A" is activated and the "double" operator 39 is not activated, it is to be interpreted as "A". A single alphabet set with its operators is therefore capable of conveying exactly the same information as two alphabet sets are capable of conveying in conventional practice.

Table I set forth below shows a number of groups of alphabet sets and operators, there being two alphabet sets, two "reverse" operators, there being two alphabet sets, two "reverse" operators, and two "double" operators per group. Various letters and operators are stroked, and, at the left of each group, the meaning conveyed is indicated, blanks being indicated by the symbol "ϕ". Thus for the first group, in which no letters and no operators are stroked, no meaning is assigned. The meanings assigned to the succeeding groups are respectively A, AA, AB, BA, AAA, etc. A review of Table I will make clear the broad principle of the invention.

TABLE I

| | | A | B | C | D | E | F | G | H | I | J | K |
|---|---|---|---|---|---|---|---|---|---|---|---|---|
| | ← | A | B | C | D | E | F | G | H | I | J | K |
| | + | L | M | N | O | P | QR | S | T | UV | WX | YZ |
| ØØØØ | | | | | | | | | | | | | |
| | ← | A | B | C | D | E | F | G | H | I | J | K |
| | + | L | M | N | O | P | QR | S | T | UV | WX | YZ |
| | ← | Ø | B | C | D | E | F | G | H | I | J | K |
| | + | L | M | N | O | P | QR | S | T | UV | WX | YZ |
| AØØØ | | | | | | | | | | | | | |
| | ← | A | B | C | D | E | F | G | H | I | J | K |
| | + | L | M | N | O | P | QR | S | T | UV | WX | YZ |
| | ← | Ø | B | C | D | E | F | G | H | I | J | K |
| | ⊬ | L | M | N | O | P | QR | S | T | UV | WX | YZ |
| AAØØ | | | | | | | | | | | | | |
| | ← | A | B | C | D | E | F | G | H | I | J | K |
| | + | L | M | N | O | P | QR | S | T | UV | WX | YZ |
| ABØØ | | | | | | | | | | | | | |
| | ← | Ø | Ø | C | D | E | F | G | H | I | J | K |
| | + | L | M | N | O | P | QR | S | T | UV | WX | YZ |
| | ← | A | B | C | D | E | F | G | H | I | J | K |
| | + | L | M | N | O | P | QR | S | T | UV | WX | YZ |
| BBØØ | | | | | | | | | | | | | |
| | ← | Ø | Ø | C | D | E | F | G | H | I | J | K |
| | + | L | M | N | O | P | QR | S | T | UV | WX | YZ |
| | ← | Ø | B | C | D | E | F | G | H | I | J | K |
| | ⊬ | L | M | N | O | P | GR | S | T | UV | WX | YZ |
| AAAØ | | | | | | | | | | | | | |
| | ← | Ø | B | C | D | E | F | G | H | I | J | K |
| | + | L | M | N | O | P | QR | S | T | UV | WX | YZ |
| | ← | Ø | B | C | D | E | F | G | H | I | J | K |
| | ⊬ | L | M | N | O | P | QR | S | T | UV | WX | YZ |
| AABØ | | | | | | | | | | | | | |
| | ← | A | Ø | C | D | E | F | G | H | I | J | K |
| | + | L | M | N | O | P | QR | S | T | UV | WX | YZ |
| | ← | Ø | Ø | C | D | E | F | G | H | I | J | K |
| | + | L | M | N | O | P | QR | S | T | UV | WX | YZ |
| ABAØ | | | | | | | | | | | | | |
| | ← | Ø | B | C | D | E | F | G | H | I | J | K |
| | + | L | M | N | O | P | QR | S | T | UV | WX | YZ |
| | ← | Ø | Ø | C | D | E | F | G | H | I | J | K |
| | + | L | M | N | O | P | QR | S | T | UV | WX | YZ |
| ABBØ | | | | | | | | | | | | | |
| | ← | A | Ø | C | D | E | F | G | H | I | J | K |
| | + | L | M | N | O | P | QR | S | T | UV | WX | YZ |
| | ⊬ | Ø | Ø | C | D | E | F | G | H | I | J | K |
| | + | L | M | N | O | P | QR | S | T | UV | WX | YZ |
| BAAØ | | | | | | | | | | | | | |
| | ← | Ø | B | C | D | E | F | G | H | I | J | K |
| | + | L | M | N | O | P | QR | S | T | UV | WX | YZ |
| | ⊬ | Ø | Ø | C | D | E | F | G | H | I | J | K |
| | + | L | M | N | O | P | QR | S | T | UV | WX | YZ |
| BABØ | | | | | | | | | | | | | |
| | ← | A | Ø | C | D | E | F | G | H | I | J | K |
| | + | L | M | N | O | P | QR | S | T | UV | WX | YZ |
| | ← | Ø | B | C | D | E | F | G | H | I | J | K |
| | ⊬ | L | M | N | O | P | QR | S | T | UV | WX | YZ |
| AAAA | | | | | | | | | | | | | |
| | ← | Ø | B | C | D | E | F | G | H | I | J | K |
| | ⊬ | L | M | N | O | P | QR | S | T | UV | WX | YZ |
| | ← | Ø | B | C | D | E | F | G | H | I | J | K |
| | ⊬ | L | M | N | O | P | QR | S | T | UV | WX | YZ |
| AAAB | | | | | | | | | | | | | |
| | ← | Ø | Ø | C | D | E | F | G | H | I | J | K |
| | + | L | M | N | O | P | QR | S | T | UV | WX | YZ |
| | ← | Ø | Ø | C | D | E | F | G | H | I | J | K |
| | + | L | M | N | O | P | QR | S | T | UV | WX | YZ |
| ABAA | | | | | | | | | | | | | |
| | ← | Ø | B | C | D | E | F | G | H | I | J | K |
| | ⊬ | L | M | N | O | P | QR | S | T | UV | WX | YZ |
| | ← | Ø | Ø | C | D | E | F | G | H | I | J | K |
| | + | L | M | N | O | P | QR | S | T | UV | WX | YZ |
| ABAB | | | | | | | | | | | | | |
| | ← | Ø | Ø | C | D | E | F | G | H | I | J | K |
| | + | L | M | N | O | P | QR | S | T | UV | WX | YZ |
| | ⊬ | Ø | Ø | C | D | E | F | G | H | I | J | K |
| | + | L | M | N | O | P | QR | S | T | UV | WX | YZ |
| BAAA | | | | | | | | | | | | | |
| | ← | Ø | B | C | D | E | F | G | H | I | J | K |
| | ⊬ | L | M | N | O | P | QR | S | T | UV | WX | YZ |
| | ⊬ | Ø | Ø | C | D | E | F | G | H | I | J | K |
| | + | L | M | N | O | P | QR | S | T | UV | WX | YZ |
| BAAB | | | | | | | | | | | | | |
| | ← | Ø | Ø | C | D | E | F | G | H | I | J | K |
| | + | L | M | N | O | P | QR | S | T | UV | WX | YZ |
| | ← | A | B | C | D | E | F | G | H | I | J | K |
| | + | L | M | N | O | P | QR | Ø | T | UV | WX | YZ |

TABLE I-continued

| | | | | | | | | | | | | |
|---|---|---|---|---|---|---|---|---|---|---|---|---|
| Sbbb | | | | | | | | | | | | |
| | ← | A | B | C | D | E | F | G | H | I | J | K |
| | + | L | M | N | O | P | QR | S | T | UV | WX | YZ |
| | ← | A | B | C | D | E | F | G | H | I | J | K |
| | ≠ | L | M | N | O | P | QR | S̸ | T | UV | WX | YZ |
| SSbb | | | | | | | | | | | | |
| | ← | A | B | C | D | E | F | G | H | I | J | K |
| | + | L | M | N | O | P | QR | S | T | UV | WX | YZ |
| | ← | A | B | C | D | E | F | G | H | I | J | K |
| | + | L | M | N | O | P | QR | S̸ | T̸ | UV | WX | YZ |
| STbb | | | | | | | | | | | | |
| | ← | A | B | C | D | E | F | G | H | I | J | K |
| | + | L | M | N | O | P | QR | S | T | UV | WX | YZ |
| | ≠ | A | B | C | D | E | F | G | H | I | J | K |
| | + | L | M | N | O | P | QR | S̸ | T̸ | UV | WX | YZ |
| TSbb | | | | | | | | | | | | |
| | ← | A | B | C | D | E | F | G | H | I | J | K |
| | + | L | M | N | O | P | QR | S | T | UV | WX | YZ |
| | ← | A | B | C | D | E | F | G | H | I | J | K |
| | ≠ | L | M | N | O | P | QR | S̸ | T | UV | WX | YZ |
| SSSb | | | | | | | | | | | | |
| | ← | A | B | C | D | E | F | G | H | I | J | K |
| | + | L | M | N | O | P | QR | S̸ | T | UV | WX | YZ |
| | ← | A | B | C | D | E | F | G | H | I | J | K |
| | + | L | M | N | O | P | QR | S̸ | T̸ | UV | WX | YZ |
| STSS | | | | | | | | | | | | |
| | ← | A | B | C | D | E | F | G | H | I | J | K |
| | ≠ | L | M | N | O | P | QR | S̸ | T | UV | WX | YZ |
| | ≠ | A | B | C | D | E | F | G | H | I | J | K |
| | + | L | M | N | O | P | QR | S | T | UV | WX | YZ |
| TSST | | | | | | | | | | | | |
| | ← | A | B | C | D | E | F | G | H | I | J | K |
| | + | L | M | N | O | P | QR | S̸ | T̸ | UV | WX | YZ |
| | ← | A̸ | B | C | D | E | F | G | H | I | J | K |
| | + | L | M | N | O | P | QR | S̸ | T | UV | WX | YZ |
| ASbb | | | | | | | | | | | | |
| | ← | A | B | C | D | E | F | G | H | I | J | K |
| | + | L | M | N | O | P | QR | S | T | UV | WX | YZ |
| | ≠ | A | B | C | D | E | F | G | H | I | J | K |
| | + | L | M | N | O | P | QR | S̸ | T | UV | WX | YZ |
| SAbb | | | | | | | | | | | | |
| | ← | A | B | C | D | E | F | G | H | I | J | K |
| | + | L | M | N | O | P | QR | S | T | UV | WX | YZ |
| | ≠ | A̸ | B | C | D | E | F | G | H | I | J | K |
| | + | L | M | N | O | P | QR | S̸ | T | UV | WX | YZ |
| SATb | | | | | | | | | | | | |
| | ← | A | B | C | D | E | F | G | H | I | J | K |
| | + | L | M | N | O | P | QR | S | T̸ | UV | WX | YZ |
| | ≠ | A̸ | B | C | D | E | F | G | H | I | J | K |
| | + | L | M | N | O | P | QR | S | T̸ | UV | WX | YZ |
| TASb | | | | | | | | | | | | |
| | ← | A | B | C | D | E | F | G | H | I | J | K |
| | + | L | M | N | O | P | QR | S̸ | T | UV | WX | YZ |
| | ← | A | B | C | D | E | F | G | H | I | J | K |
| | + | L | M | N | O | P | QR | S | T | UV | WX | YZ |
| ASBS | | | | | | | | | | | | |
| | ← | A | B | C | D | E | F | G | H | I | J | K |
| | + | L | M | N | O | P | QR | S | T | UV | WX | YZ |
| | ≠ | A̸ | B | C | D | E | F | G | H | I | J | K |
| | + | L | M | N | O | P | QR | S̸ | T | UV | WX | YZ |
| SABT | | | | | | | | | | | | |
| | ← | A | B̸ | C | D | E | F | G | H | I | J | K |
| | + | L | M | N | O | P | QR | S | T̸ | UV | WX | YZ |
| | ← | A | B | C̸ | D | E | F | G | H | I | J | K |
| | + | L̸ | M | N | O | P | QR | S | T | UV | WX | YZ |
| CLbb | | | | | | | | | | | | |
| | ← | A | B | C | D | E | F | G | H | I | J | K |
| | + | L | M | N | O | P | QR | S | T | UV | WX | YZ |
| | ≠ | A | B | C̸ | D | E | F | G | H | I | J | K |
| | + | L̸ | M | N | O | P | QR | S | T | UV | WX | YZ |
| LCbb | | | | | | | | | | | | |
| | ← | A | B | C | D | E | F | G | H | I | J | K |
| | + | L | M | N | O | P | QR | S | T | UV | WX | YZ |
| | ≠ | A | B | C̸ | D | E | F | G | H | I | J | K |
| | + | L̸ | M | N | O | P | QR | S | T | UV | WX | YZ |
| LCLb | | | | | | | | | | | | |
| | ← | A | B | C̸ | D | E | F | G | H | I | J | K |
| | + | L̸ | M | N | O | P | QR | S | T | UV | WX | YZ |
| | 77 | A | B | C̸ | D | E | F | G | H | I | J | K |
| | + | L | M | N | O | P | QR | S | T | UV | WX | YZ |
| CLLC | | | | | | | | | | | | |
| | ≠ | A | B | C̸ | D | E | F | G | H | I | J | K |
| | + | L̸ | M | N | O | P | QR | S | T | UV | WX | YZ |

TABLE I-continued

|      |     | A | B | C | D | E | F  | G | H    | I  | J  | K  |
|------|-----|---|---|---|---|---|----|---|------|----|----|----|
|      | ←   | A | B | C | D | E | F  | G | ~~H~~| I  | J  | K  |
|      | +   | L | M | N | O | P | QR | S | ~~T~~| UV | WX | YZ |
| HTTA |     |   |   |   |   |   |    |   |      |    |    |    |
|      | ~~←~~| ~~A~~ | B | C | D | E | F | G | H | I | J | K |
|      | +   | L | M | N | O | P | QR | S | ~~T~~| UV | WX | YZ |
|      | ←   | A | B | C | D | E | F  | G | ~~H~~| I | J | K |
|      | ~~+~~| L | M | N | O | P | QR | S | T | UV | WX | YZ |
| HHAT |     |   |   |   |   |   |    |   |      |    |    |    |
|      | ←   | ~~A~~ | B | C | D | E | F | G | H | I | J | K |
|      | +   | L | M | N | O | P | QR | S | ~~T~~| UV | WX | YZ |

The format indicated above is ideally suited for use by specialists at the trading posts of a stock exchange to record the results of securities auctions. For example, the brokers for the buyer and seller are each identified by one to four letters, so that any broker can be uniquely specified using one group of two alphabet sets plus operators. By substituting numeric characters for the alpha characters in a part of the card, the price, the number of shares traded, the number of surplus shares on the buy or sell side, etc., can all be indicated.

In another embodiment (not illustrated) of the mark-sense card, the "reverse" and "double" operators are combined into a single operator. The single operator can of course be of arbitrary design, for example an arrow facing to the left with a vertical line drawn through the arrow shaft, thus: ←|

This design is suggested by a fusion of the two operators considered above. No ambiguity results, since the new operator functions as a "reverse" operator if two associated characters are marked and as a "double" operator if only one associated character is marked. Only one such combined operator need be associated with each alphabet set.

FIG. 3 shows in greater detail the feeding of the mark-sense card 10 (see edgewise) by card transporter wheels 42, 43 past optical read heads 44. The card transporter wheels 42, 43 are driven so that they rotate in the directions respectively indicated by arrows 45 and 46 and transport the mark-sense card 10 in the direction indicated by the arrow 47. The Bourns card reader has the ability to read both sides of a mark-sense card, since it has two sets of scanning heads (the second of which is not shown) to read the data from the card as well as means for identifying timing marks on the edge of the card. Thus both sides of the card can be utilitized.

The optical read heads 44 develop signals on output lines 48 which are representative of the activated characters and operators of the mark-sense card 10 read by the heads 44. These signals are supplied to a signal interpreter 50 which develops signals on output lines 51. The latter signals are processed by an output message formatter 52 which is coupled by a link 53 to a transmitter 54. The transmitter 54 transmits signals to the interpretation computer 14 (FIG. 1) via a link 55.

As FIG. 4 shows, the signals on the link 55 are received by a receiver 56, which is connected by a link 57 to a signal interpreter 58. The signal interpreter 58 includes translation program logic 59, which may be embodied in hard-wired circuitry exclusively but preferably includes software, under the guidance of which the signal interpreter 58 interprets the signals in the manner explained above. The signal interpreter 58 communicates via a link 60 with an output message formatter 61. The formatter 61 communicates via a link 62 with a transmitter 63. The transmitter 63 communicates with the main computer 16 (FIG. 1) via a link 64.

FIG. 5 shows in greater detail the translation program logic 59 for use where the operators employed are the ones illustrated in FIG. 2 and Table I. The logical operations can be performed by the main computer 16 but are preferably performed by the interpretation computer 14. The input operators and characters are received as indicated at 65 and examined as indicated at branch point 66 to determine whether the "reverse" operator is marked. If it is not marked an examination is made as indicated at branch point 67 to determine whether the "double" operator is marked. If that operator is also not marked an examination is made as indicated at branch point 68 to determine the number of alphameric characters marked. If one such character is marked, the character read is placed in position 1 (the left-hand position of two character positions), and a blank is placed in position 2 (the right-hand position of the two character positions), as indicated in action box 69. The program then exits as indicated at 70.

If the number of characters found at branch point 68 is two, then a determination is made whether the character in question is the first of these two characters, as indicated at branch point 71. If so, the character in question is placed in character position 1, as indicated in action box 72, and the program loops back to branch point 71, at which time the decision must be "no", since the first character has already been read. On the second loop, therefore, the character in question is placed in character position 2, as indicated in action box 73, and the program exits as indicated at 74.

If the number of characters found at branch point 68 is other than 1 or 2, then a determination is made whether the number of characters is 0, as indicated at branch point 75. If so, the examined card field is blank. A blank is placed in character position 1 and a second blank is placed in character position 2, as indicated in action box 76. The program then exits as indicated at 77. If not, then the number of characters is not 0, 1 or 2, and an error has been made, as indicated at 78. This fact is noted for inclusion in the subsequent report, and the program exits at 79.

If it is determined at branch point 66 that the "reverse" operator is marked, then a determination is made at branch point 80 whether two characters are also marked. If not, an error has been made, which is noted as shown by action box 81 for inclusion in the subsequent report, and the program exits at 82. If at branch point 80 it is determined that two characters are activated, then it is determined at branch point 83 whether the character in question is the first character read. If so, this character is placed in character position 2 (rather than position 1), as indicated in action box 84, and the program loops back to branch point 83. Upon looping back to branch point 83, it will be determined that the character in question is not the first character read, and that character will therefore be placed in character position 1, as indicated in action box 85. The program thereupon exits as indicated at 86.

If at branch point 67 it is determined that the "double" operator has been marked, then a determination is made at branch point 88 whether one character has been marked. If the naswer is no, an error has been made, which will be noted in the final report, as indicated at action box 89, and the program exits as indicated at 90. If it is determined at branch point 88 that one character has been marked, then it is determined at branch point 91 whether the character in question is on its first loop. If so, the character is placed in character position 1, as indicated at action box 92, and the program loops back to branch point 91. It will then be determined that it is not the first loop, and the same character will be placed again in character position 2, as indicated in action box 93. The program then exits as indicated at 94.

The Collins Radio interpretation computer 14 can control one or more lines, and each line can connect to one or more terminals, although only one terminal at a time can be active on any given line. The reader, which is a type of terminal, does nothing until polled by the interpretation computer. If there is no card to be read, the reader so informs the interpretation computer. If a card is waiting to be read, it is commanded by the interpretation computer to read the card and the matrix or table of information is transmitted to the interpretation computer. The reader detects only physical errors, such as an incorrectly aligned card, and does not detect logical errors.

The interpretation computer examines the message from the reader for logical errors. It cannot check the ultimate validity of the information but only the correctness of the card markings from a logical viewpoint. If the message is valid as determined by this test, the interpretation computer can order the reader to stamp an acceptance code on the card itself and orders the reader to place the card in the acceptance hopper (not shown) of the reader. If the message fails the logic test, the card is stamped with an error code and placed in the reader's reject hopper (not shown). The interpretation computer transmits all messages, good or failed, to the main computer, which in the case of an error formats an error message and sends it to a printer along with the valid messages.

Thus there are provided in accordance with the invention a novel and highly-effective mark-sense card and a method of, and apparatus for, reading the card. Many modifications of the representative embodiments of the invention disclosed herein will readily occur to those skilled in the art upon considering this disclosure.

For example, the design and meaning of the operator can be varied to suit the requirements of a particular application. Thus an operator may be provided indicating when activated that an associated activated indicium is to be interpreted as though activated three times or that three associated activated indicia are to be understood in a particular order. Moreover, the computers and other hardware employed may be selected from a wide variety of commercially available components. Further, the principles of the invention are applicable to many types of records, including those scanned magnetically rather than optically and those whereon the information is recorded by means other than a hand-held writing implement. Accordingly, the invention is to be construed as including all of the embodiments within the scope of the appended claims:

I claim:

1. A machine-readable record adapted for data compression and comprising a plurality of visible indicia which when unmarked convey no information, at least one of which indicia can be selectively marked, said indicia when so marked and conveyed into cooperative relation to compatible read means normally being given a first interpretation, and
   at least one visible operator that is associated with said plurality of indicia, that when unmarked conveys no information and that can be selectively marked, said operator when so marked and conveyed into cooperative relation to compatible read means signifying that said selectively marked indicia are to be interpreted as though occurring an additional number of times or in a different order;
   whereby the meaning of said selectively marked indicia can be determined not from said selectively marked indicia alone but from said selectively marked indicia in conjunction with said operator.

2. A machine-readable record according to claim 1 comprising a card adapted for optical scanning, said indicia and said operator being preprinted thereon and being activated by means of a writing implement.

3. A machine-readable record according to claim 1 wherein said operator when so activated signifies that, if only one of said indicia is activated, it is to be interpreted as though two identical such indicia had been activated.

4. A machine-readable record according to claim 1 wherein said operator when so activated signifies that, if only two of said indicia are activated, the order in which they are normally understood is to be reversed.

5. A machine-readable recording according to claim 1 wherein said operator when so activated signifies that,
   if only one of said indicia is activated, it is to be interpreted as though two identical such indicia had been indicated; and,
   if only two of said indicia are activated, the order in which they are normally understood is to be reversed.

6. A machine-readable record according to claim 1 wherein said indicia comprise alphameric characters.

7. Apparatus comprising
   (a) a machine-readable record adapted for data compression and comprising
   a plurality of visible indicia which when unmarked convey no information, at least one of which indicia can be selectively marked, said indica when so marked and conveyed into cooperative relation to compatible read means normally being given a first interpretation, and
   at least one visible operator that is associated with said plurality of indicia, that when unmarked conveys no information and that can be selectively marked, said operator when so marked and conveyed into cooperative relation to compatible read means signifying that said selectively marked indicia are to be interpreted as though occurring an additional number of times or in a different order;
   (b) read means compatible with said record for scanning said record and generating signals representative of any and all marked operators and indicia thereon; and
   (c) computer means responsive to said signals for making a determination whether said at least one operator has been marked and for interpreting the signals representative of said selectively marked indicia not in accordance with said selectively marked indicia alone but in accordance with said selectively marked indicia in conjunction with said operator.

8. A method of increasing the information that can be recorded on a deck of mark-sense cards, comprising the steps of
   (a) preforming at least one set of visible indicia which when unmarked convey no information on each of said mark-sense cards, at least one of which indicia of each set can be manually selectively marked, said indicia when so marked normally being given a first interpretation;
   (b) preforming at least one visible operator which when unmarked conveys no information on said mark-sense cards in association with each of said sets, which operator can be manually selectively marked, said operator when so marked signifying that said selectively-marked indicia of the associated set are to be interpreted as though occurring an additional number of times or in a different order;
   (c) selectively manually marking said plurality of indicia of each of said sets;
   (d) manually marking said at least one operator associated with selected ones of said sets; and
   (e) interpreting said selectively marked indicia not in accordance with said selectively marked indicia alone but in accordance with said selectively marked indicia in conjunction with said operators respectively associated therewith.

* * * * *

UNITED STATES PATENT AND TRADEMARK OFFICE
CERTIFICATE OF CORRECTION

PATENT NO. : 4,149,670
DATED : April 17, 1979
INVENTOR(S) : Clive W. Axelrod

It is certified that error appears in the above-identified patent and that said Letters Patent are hereby corrected as shown below:

Please cancel Table I, Cols. 5, 7 and 9 and substitute therefor

TABLE I

| | | | | | | | | | | | |
|---|---|---|---|---|---|---|---|---|---|---|---|
| ̸b̸b̸b̸b | ← | A | B | C | D | E | F | G | H | I | J | K |
| | ÷ | L | M | N | O | P | QR | S | T | UV | WX | YZ |
| | ← | A | B | C | D | E | F | G | H | I | J | K |
| | ÷ | L | M | N | O | P | QR | S | T | UV | WX | YZ |
| A̸b̸b̸b | ← | A̸ | B | C | D | E | F | G | H | I | J | K |
| | ÷ | L | M | N | O | P | QR | S | T | UV | WX | YZ |
| | ← | A | B | C | D | E | F | G | H | I | J | K |
| | ÷ | L | M | N | O | P | QR | S | T | UV | WX | YZ |

UNITED STATES PATENT OFFICE
CERTIFICATE OF CORRECTION

Patent No. __4,149,670__      Dated __April 17, 1979__

Inventor(s) __Clive W. Axelrod__

It is certified that error appears in the above-identified patent and that said Letters Patent are hereby corrected as shown below:

| | | | | | | | | | | | |
|---|---|---|---|---|---|---|---|---|---|---|---|
| AA∅∅ | ←<br>≠ | A̸<br>L | B<br>M | C<br>N | D<br>O | E<br>P | F<br>QR | G<br>S | H<br>T | I<br>UV | J<br>WX | K<br>YZ |
| | ←<br>+ | A<br>L | B<br>M | C<br>N | D<br>O | E<br>P | F<br>QR | G<br>S | H<br>T | I<br>UV | J<br>WX | K<br>YZ |
| AB∅∅ | ←<br>+ | A̸<br>L | B̸<br>M | C<br>N | D<br>O | E<br>P | F<br>QR | G<br>S | H<br>T | I<br>UV | J<br>WX | K<br>YZ |
| | ←<br>+ | A<br>L | B<br>M | C<br>N | D<br>O | E<br>P | F<br>QR | G<br>S | H<br>T | I<br>UV | J<br>WX | K<br>YZ |
| BA∅∅ | ←/<br>+ | A̸<br>L | B̸<br>M | C<br>N | D<br>O | E<br>P | F<br>QR | G<br>S | H<br>T | I<br>UV | J<br>WX | K<br>YZ |
| | ←<br>+ | A<br>L | B<br>M | C<br>N | D<br>O | E<br>P | F<br>QR | G<br>S | H<br>T | I<br>UV | J<br>WX | K<br>YZ |
| AAA∅ | ←<br>≠ | A̸<br>L | B<br>M | C<br>N | D<br>O | E<br>P | F<br>GR | G<br>S | H<br>T | I<br>UV | J<br>WX | K<br>YZ |
| | ←<br>+ | A̸<br>L | B<br>M | C<br>N | D<br>O | E<br>P | F<br>QR | G<br>S | H<br>T | I<br>UV | J<br>WX | K<br>YZ |

UNITED STATES PATENT OFFICE
CERTIFICATE OF CORRECTION

Patent No. 4,149,670            Dated April 17, 1979

Inventor(s) Clive W. Axelrod

It is certified that error appears in the above-identified patent and that said Letters Patent are hereby corrected as shown below:

|       |      |   |   |   |   |   |    |   |   |    |    |    |
|-------|------|---|---|---|---|---|----|---|---|----|----|----|
|       | ←    | A̸ | B | C | D | E | F  | G | H | I  | J  | K  |
|       | ¥    | L | M | N | O | P | QR | S | T | UV | WX | YX |
| AAB B̸ |      |   |   |   |   |   |    |   |   |    |    |    |
|       | ←    | A | B̸ | C | D | E | F  | G | H | I  | J  | K  |
|       | +    | L | M | N | O | P | QR | S | T | UV | WX | YZ |
|       | ←    | A̸ | B̸ | C | D | E | F  | G | H | I  | J  | K  |
|       | +    | L | M | N | O | P | QR | S | T | UV | WX | YZ |
| ABA B̸ |      |   |   |   |   |   |    |   |   |    |    |    |
|       | ←    | A̸ | B | C | D | E | F  | G | H | I  | J  | K  |
|       | +    | L | M | N | O | P | QR | S | T | UV | WX | YZ |
|       | ←    | A̸ | B̸ | C | D | E | F  | G | H | I  | J  | K  |
|       | ÷    | L | M | N | O | P | QR | S | T | UV | WX | YZ |
| ABB B̸ |      |   |   |   |   |   |    |   |   |    |    |    |
|       | ←    | A | B̸ | C | D | E | F  | G | H | I  | J  | K  |
|       | ÷    | L | M | N | O | P | QR | S | T | UV | WX | YZ |
|       | ←/   | A̸ | B̸ | C | D | E | F  | G | H | I  | J  | K  |
|       | ÷    | L | M | N | O | P | QR | S | T | UV | WX | YZ |
| BAA B̸ |      |   |   |   |   |   |    |   |   |    |    |    |
|       | ←    | A̸ | B | C | D | E | F  | G | H | I  | J  | K  |
|       | +    | L | M | N | O | P | QR | S | T | UV | WX | YZ |

UNITED STATES PATENT OFFICE
CERTIFICATE OF CORRECTION

Patent No. 4,149,670      Dated April 17, 1979

Inventor(s) Clive W. Axelrod

It is certified that error appears in the above-identified patent and that said Letters Patent are hereby corrected as shown below:

| | | | | | | | | | | | |
|---|---|---|---|---|---|---|---|---|---|---|---|
| BABB | ←/ + | A̸ L | B̸ M | C N | D O | E P | F QR | G S | H T | I UV | J WX | K YZ |
| | ← + | A L | B̸ M | C N | D O | E P | F QR | G S | H T | I UV | J WX | K YZ |
| AAAA | ← ≠ | A̸ L | B M | C N | D O | E P | F QR | G S | H T | I UV | J WX | K YZ |
| | ← ≠ | A̸ L | B M | C N | D O | E P | F QR | G S | H T | I UV | J WX | K YZ |
| AAAB | ← ≠ | A̸ L | B M | C N | D O | E P | F QR | G S | H T | I UV | J WX | K YZ |
| | ← + | A̸ L· | B̸ M | C N | D O | E P | F QR | G S | H T | I UV | J WX | K YZ |
| ABAA | ← + | A̸ L | B̸ M | C N | D O | E P | F QR | G S | H T | I UV | J WX | K YZ |
| | ← ≠ | A̸ L | B M | C N | D O | E P | F QR | G S | H T | I UV | J WX | K YZ |

UNITED STATES PATENT AND TRADEMARK OFFICE
CERTIFICATE OF CORRECTION

PATENT NO. : 4,149,670  Page 5 of 10
DATED : April 17, 1979
INVENTOR(S) : Clieve W. Axelrod It is certified that error appears in the above-identified patent and that said Letters Patent are hereby corrected as shown below:

| | | | | | | | | | | | | |
|---|---|---|---|---|---|---|---|---|---|---|---|---|
| ABAB | ← + | A̸ L | B̸ M | C N | D O | E P | F QR | G S | H T | I UV | J WX | K YZ |
| | ← + | A̸ L | B̸ M | C N | D O | E P | F QR | G S | H T | I UV | J WX | K YZ |
| BAAA | ← + | A̸ L | B̸ M | C N | D O | E P | F QR | G S | H T | I UV | J WX | K YZ |
| | ← ≠ | A̸ L | B M | C N | D O | E P | F QR | G S | H T | I UV | J WX | K YZ |
| BAAB | ← ÷ | A̸ L | B M | C N | D O | E P | F QR | G S | H T | I UV | J WX | K YZ |
| | ← ÷ | A̸ L | B̸ M | C N | D O | E P | F QR | G S | H T | I UV | J WX | K YZ |
| SB̸B̸B̸ | ← + | A L | B M | C N | D O | E P | F QR | G̸ T | H T | I UV | J WX | K YZ |
| | ← + | A L | B M | C N | D O | E P | F QR | G S | H T | I UV | J WX | K YZ |

UNITED STATES PATENT AND TRADEMARK OFFICE
CERTIFICATE OF CORRECTION

PATENT NO. : 4,149,670  
DATED : April 17, 1979  
INVENTOR(S) : Clive W. Axelrod It is certified that error appears in the above-identified patent and that said Letters Patent are hereby corrected as shown below:

| | | A | B | C | D | E | F | G | H | I | J | K |
|---|---|---|---|---|---|---|---|---|---|---|---|---|
| SS∅∅ | ← / | L | M | N | O | P | QR | ~~S~~ | T | UV | WX | YZ |
| | ← + | A L | B M | C N | D O | E P | F QR | G S | H T | I UV | J WX | K YZ |
| ST∅∅ | ← + | A L | B M | C N | D O | E P | F QR | G ~~S~~ | H ~~T~~ | I UV | J WX | K YZ |
| | ← + | A L | B M | C N | D O | E P | F QR | G S | H T | I UV | J WX | K YZ |
| TS∅∅ | ←/ + | A L | B M | C N | D O | E P | F QR | G ~~S~~ | H ~~T~~ | I UV | J WX | K ·YZ |
| | ← + | A L | B M | C N | D O | E P | F QR | G S | H T | I UV | J WX | K YZ |
| SSS∅ | ← / | A L | B M | C N | D O | E P | F QR | G ~~S~~ | H T | I UV | J WX | K YZ |
| | ← + | A L | B M | C N | D O | E P | F QR | G ~~S~~ | H T | I UV | J WX | K YZ |

UNITED STATES PATENT AND TRADEMARK OFFICE
CERTIFICATE OF CORRECTION

PATENT NO. : 4,149,670  Page 7 of 10
DATED : April 17, 1979
INVENTOR(S) : Clive W. Axelrod It is certified that error appears in the above-identified patent and that said Letters Patent are hereby corrected as shown below:

| | | A | B | C | D | E | F | G | H | I | J | K |
|---|---|---|---|---|---|---|---|---|---|---|---|---|
| STSS | ← +  | A L | B M | C N | D O | E P | F QR | G $\cancel{S}$ | H $\cancel{T}$ | I UV | J WX | K YZ |
| | ← $\cancel{+}$ | A L | B M | C N | D O | E P | F QR | G $\cancel{S}$ | H T | I UV | J WX | K YZ |
| TSST | ⤆ + | A L | B M | C N | D O | E P | F QR | G $\cancel{S}$ | H $\cancel{T}$ | I UV | J WX | K YZ |
| | ← ÷ | A L | B M | C N | D O | E P | F QR | G $\cancel{S}$ | H $\cancel{T}$ | I UV | J WX | K YZ |
| AS$\cancel{SS}$ | ← ÷ | $\cancel{A}$ L | B M | C N | D O | E P | F QR | G $\cancel{S}$ | H T | I UV | J WX | K YZ |
| | ← ÷ | A L | B M | C N | D O | E P | F QR | G S | H T | I UV | J WX | K YZ |
| SA$\cancel{SS}$ | ⤆ + | $\cancel{A}$ L | B M | C N | D O | E P | F QR | G $\cancel{S}$ | H T | I UV | J WX | K YZ |
| | ← + | A L | B M | C N | D O | E P | F QR | G S | H T | I UV | J WX | K YZ |

UNITED STATES PATENT AND TRADEMARK OFFICE
CERTIFICATE OF CORRECTION

PATENT NO. : 4,149,670  
DATED : April 17, 1979  
INVENTOR(S) : Clive W. Axelrod Page 8 of 10

It is certified that error appears in the above—identified patent and that said Letters Patent are hereby corrected as shown below:

| | | | | | | | | | | | |
|---|---|---|---|---|---|---|---|---|---|---|---|
| SATØ | ←∕ + | Ⱥ L | B M | C N | D O | E P | F QR | G Ø | H T | I UV | J WX | K YZ |
| | ← + | A L | B M | C N | D O | E P | F QR | G S | H Ŧ | I UV | J WX | K YZ |
| TASØ | ←∕ + | Ⱥ L | B M | C N | D O | E P | F QR | G S | H Ŧ | I UV | J WX | K YZ |
| | ← + | A L | B M | C N | D. O | E P | F QR | G Ø | H T | I UV | J WX | K YZ |
| ASBS | ← + | Ⱥ L | B M | C N | D O | ·E P | F QR | G Ø | H T | I UV | J WX | K YZ |
| | ← + | A L | ฿ M | C N | D O | E P | F QR | G Ø | H T | I UV | J WX | K YZ |
| SABT | ←∕ + | Ⱥ L | B M | C N | D O | E P | F QR | G Ø | H T | I UV | J WX | K YZ |
| | ← + | A L | ฿ M | C N | D O | E P | F QR | G S | H Ŧ | I UV | J WX | K YZ |

UNITED STATES PATENT AND TRADEMARK OFFICE
CERTIFICATE OF CORRECTION

PATENT NO. : 4,149,670  Page 9 of 10
DATED : April 17, 1979
INVENTOR(S) : Clive W. Axelrod It is certified that error appears in the above-identified patent and that said Letters Patent are hereby corrected as shown below:

| | | A | B | ¢ | D | E | F | G | H | I | J | K |
|---|---|---|---|---|---|---|---|---|---|---|---|---|
| CL̷B̷ | ← + | A L̷ | B M | ¢ N | D O | E P | F QR | G S | H T | I UV | J WX | K YZ |
| | ← + | A L | B M | C N | D O | E P | F QR | G S | H T | I UV | J WX | K YZ |
| LCB̷B̷ | ←/ + | A L̷ | B M | ¢ N | D O | E P | F QR | G S | H T | I UV | J WX | K YZ |
| | ← + | A L | ·B M | C N | D O | E P | F QR | G S | H T | I UV | J WX | K YZ |
| LCL̷ | ←/ + | A L̷ | B M | ¢ N | D O | E P | F QR | G S | H T | I UV | J WX | K YZ |
| | ← + | A L̷ | B M | C N | D O | E· P | F QR | G S | H T | I UV | J WX | K YZ |
| CLLC | ← + | A L̷ | B M | ¢ N | D O | E P | F QR | G S | H T | I UV | J WX | K YZ |
| | ←/ + | A L̷ | B M | ¢ N | D O | E P | F QR | G S | H T | I UV | J WX | K YZ |

UNITED STATES PATENT AND TRADEMARK OFFICE
CERTIFICATE OF CORRECTION

PATENT NO. : 4,149,670
DATED : April 17, 1979
INVENTOR(S) : Clive W. Axelrod

It is certified that error appears in the above-identified patent and that said Letters Patent are hereby corrected as shown below:

| | | | | | | | | | | | | |
|---|---|---|---|---|---|---|---|---|---|---|---|---|
| HTTA | ←+ | A L | B M | C N | D O | E P | F QR | G S | H̸ T̸ | I UV | J WX | K YZ |
| | ←+ | A̸ L | B M | C N | D O | E P | F QR | G S | H T̸ | I UV | J WX | K YZ |
| HHAT | ← ̸ | A L | B M | C N | D O | E P | F QR | G S | H̸ T | I UV | J WX | K YZ |
| | ←+ | A̸ L | B M | C N | D O | E P | F QR | G S | H T̸ | I UV | J WX | K YZ |

Col. 9, line 46, "utilitized" should read --utilized--;
Col. 11, line 4, "naswer" should read --answer--; Col. 12, line 48, "indica" should read --indicia--.

Signed and Sealed this

Eighteenth Day of September 1979

[SEAL]

Attest:

Attesting Officer

LUTRELLE F. PARKER
Acting Commissioner of Patents and Trademarks